United States Patent Office.

F. S. DUMONT, OF NEW YORK, N. Y.

Letters Patent No. 94,581, dated September 7, 1869.

---

IMPROVED COMPOUND TO BE USED AS A MORDANT IN DYEING AND PRINTING.

---

The Schedule referred to in these Letters Patent and making part of the same.

---

*To all whom it may concern:*

Be it known that I, F. S. DUMONT, of the city, county, and State of New York, have invented a new and improved Mordant for Dyeing and Printing; and I do hereby declare that the following is a full, clear, and exact description thereof, which will enable others skilled in the art to make and use the same, reference being had to the accompanying drawings, forming part of this specification.

This invention relates to a new mordant for all kinds of dyeing and printing-processes. The mordant is made from the serum of the blood in the following manner:

The blood of an animal is first filtered, and the coagulated mass is pressed to extract all the liquid.

To every five gallons of blood are then taken—

One ounce of arsenic acid.

Two ounces and two drams of borax.

Two ounces and one dram sulphate of zinc.

One-half ounce essence of terebinthine.

The arsenic acid, borax, and sulphate of zinc, must be separately dissolved in a small quantity of boiling water, and are then allowed to cool. The blood is then mixed with the dissolved borax, and stirred for about ten minutes. The sulphate of zinc is then added, and the whole matter strongly stirred for about fifteen minutes, when the arsenic is also put in. The mixture is then left to stand for about half an hour, when it is once more stirred, and left at rest for twelve more hours.

The essence of terebinthine is next added, the mixture well stirred and repeatedly filtered, to separate the thick parts and to render the mixture white. What remains on the sieve can be used for fertilizing, and other purposes.

For printing fabrics of suitable kind, the above mixture is allowed to evaporate in flat vessels until it has the consistency of ordinary syrup, and is then put in barrels to be shipped to suitable places.

For dyeing fabrics, the aforesaid compound is mixed with about three times its quantity of water. The fabric is then steeped in the mixture for about five minutes. The fabric is then steeped in boiling water for five or ten more minutes, for binding the mordant. Everything is now ready for dyeing without the aid of other mordants.

Having thus described my invention,

I claim as new, and desire to secure by Letters Patent—

1. The method herein described of producing mordant from blood, as set forth.

2. The composition herein specified, consisting of the ingredients set forth, and to be used for the purposes described.

F. S. DUMONT.

Witnesses:
 GEO. W. MABEE,
 ALEX. F. ROBERTS.